United States Patent
Fukui

(10) Patent No.: US 12,384,282 B2
(45) Date of Patent: Aug. 12, 2025

(54) VEHICULAR INTERIOR MATERIAL AND SEAT BACK PANEL

(71) Applicant: KOTOBUKIYA FRONTE CO., LTD., Tokyo (JP)

(72) Inventor: Kazuki Fukui, Gyoda (JP)

(73) Assignee: KOTOBUKIYA FRONTE CO., LTD., Tokyo (JP)

(*) Notice: Subject to any disclaimer, the term of this patent is extended or adjusted under 35 U.S.C. 154(b) by 400 days.

(21) Appl. No.: 18/015,896

(22) PCT Filed: Dec. 13, 2021

(86) PCT No.: PCT/JP2021/045747
§ 371 (c)(1),
(2) Date: Jan. 12, 2023

(87) PCT Pub. No.: WO2022/138264
PCT Pub. Date: Jun. 30, 2022

(65) Prior Publication Data
US 2023/0249596 A1    Aug. 10, 2023

(30) Foreign Application Priority Data
Dec. 22, 2020    (JP) ................. 2020-212871

(51) Int. Cl.
*B60N 2/70*    (2006.01)
*B23B 5/26*    (2006.01)
(Continued)

(52) U.S. Cl.
CPC ............ *B60N 2/7011* (2013.01); *B32B 5/022* (2013.01); *B32B 5/024* (2013.01); *B32B 5/18* (2013.01);
(Continued)

(58) Field of Classification Search
CPC ..... B60N 2/7011; B60N 2/7017; B32B 5/022; B32B 5/024; B32B 5/18; B32B 5/245; B32B 5/26; B32B 5/266; B32B 5/275; B32B 9/025; B32B 9/046; B32B 9/047; B32B 27/065; B32B 27/12; B32B 27/304;
(Continued)

(56) References Cited

FOREIGN PATENT DOCUMENTS

| EP | 2940065 A1 | 11/2015 |
|---|---|---|
| JP | 2020-121551 A | 8/2020 |
| KR | 20190009893 A | * 1/2019 |

OTHER PUBLICATIONS ip.com translation of KR20190009893A (Year: 2025).*
(Continued)

*Primary Examiner* — Michael Zhang
(74) *Attorney, Agent, or Firm* — Sughrue Mion, PLLC

(57) ABSTRACT

The example of the vehicular interior trim according to the present application is multilayer structure including at least a base material and a skin layer. The multilayer structure is configured to satisfy the relationships in the following expressions (1) and (2), where RSm (mm) is the average surface roughness of the base material in the horizontal direction, E1_80 is the Young's modulus of the base material at 80° C., d1 (mm) is the thickness of the base material, E2_80 (GPa) is the Young's modulus of the skin layer at 80° C., and d2 (mm) is the thickness of the skin layer. Expression (1): Expression (2):

$$0.15 < RSm/(E2\_80 \times d2) \qquad (1)$$

$$RSm/\sqrt{((E1\_80 \times d1))^2 + ((E2\_80 \times d2))^2} < 135 \qquad (2).$$

17 Claims, 4 Drawing Sheets

(51) Int. Cl.
  *B32B 5/02* (2006.01)
  *B32B 5/18* (2006.01)
  *B32B 5/24* (2006.01)
  *B32B 5/26* (2006.01)
  *B32B 9/02* (2006.01)
  *B32B 9/04* (2006.01)
  *B32B 27/06* (2006.01)
  *B32B 27/12* (2006.01)
  *B32B 27/30* (2006.01)
  *B32B 27/32* (2006.01)
  *B60R 13/02* (2006.01)

(52) U.S. Cl.
  CPC ............... *B32B 5/245* (2013.01); *B32B 5/26* (2013.01); *B32B 9/025* (2013.01); *B32B 9/046* (2013.01); *B32B 9/047* (2013.01); *B32B 27/065* (2013.01); *B32B 27/12* (2013.01); *B32B 27/304* (2013.01); *B32B 27/32* (2013.01); *B60R 13/02* (2013.01); *B32B 2266/0278* (2013.01); *B32B 2307/538* (2013.01); *B32B 2307/54* (2013.01); *B32B 2307/7376* (2023.05); *B32B 2605/003* (2013.01)

(58) Field of Classification Search
  CPC ............ B32B 27/32; B32B 2266/0278; B32B 2307/538; B32B 2307/54; B32B 2307/7376; B32B 2605/003; B32B 3/12; B60R 13/02
  See application file for complete search history.

(56) References Cited

OTHER PUBLICATIONS

Extended European Search Report dated Oct. 18, 2024, issued in application No. 21910413.0.
International Search Report for PCT/JP2021/045747 dated, Mar. 1, 2022 (PCT/ISA/210).

* cited by examiner

| | material | base RSm (mm) | 80°C Young's modulus $E2\_80$ (MPa) | thickness d2 (mm) | surface density (kg/m$^2$) | α1 | interior material RZ ※ (mm) | decision |
|---|---|---|---|---|---|---|---|---|
| conventional product | PP | | 1520 | 4.4 | 3.86 | | 0.024 | OK |
| Sample 1 | cover: PP base: Felt | 0.62 | 1520 | 2.5 | 3.6 | 0.163 | 0.023 | OK |
| Sample 2 | cover: PVC base: Felt | 0.905 | 6.3 | 1.22 | 1.66 | 124.2 | 0.039 | OK |
| Sample 3 | cover: fiber base: Felt | 0.62 | 107.5 | 0.42 | 1.57 | 13.73 | 0.032 | OK |
| Sample 4 | cover: PVC base: Felt | 1.22 | 7.6 | 1.11 | 1.87 | 160 | 0.044 | NG |
| Sample 5 | cover: PVC base: urethane foam | 1.15 | 6.3 | 1.22 | 1.53 | 121.2 | 0.038 | OK |

α1 = RSm/(E2_80×d2)
※target: 0.04 or less

VEHICULAR INTERIOR MATERIAL AND SEAT BACK PANEL

CROSS REFERENCE TO RELATED APPLICATIONS

This application is a National Stage of International Application No. PCT/JP2021/045747 filed Dec. 13, 2021, claiming priority based on Japanese Patent Application No. 2020-212871 filed Dec. 22, 2020.

FIELD

The present application relates to a vehicular interior material and a seat back panel using the same.

BACKGROUND

For example, PTL 1 discloses a press-molded body which is usable as a seat back of a vehicle. The press-molded body in PTL 1 is a cover which is fixed to non-woven fabric via an adhesive layer, and PTL 1 discloses that as the cover, natural leather, synthetic leather, fabric, or the like is used.

CITATION LIST

[Patent Literature]
[PTL 1] JP 2020-121551 A

SUMMARY

Technical Problem

It is desirable that a material used as a vehicular interior material such as a seat back panel have both of strength as an interior material and luxuriousness in an external appearance. However, a purpose of a press-molded body disclosed in PTL 1 is securement of easiness in sewing and strength, but improvement in luxuriousness of an external appearance of the press-molded body are not focused on, and there is room for improvement in this point.

To solve the above problems, an object of the present application is to provide a vehicular interior material which is improved to achieve both of a suitable external appearance and sufficient strength and a seat back panel formed by using the same.

Solution to Problem

According to one embodiment in the present application, a vehicular interior material is a laminated structure which includes at least a base material and a cover layer. The vehicular interior material is configured to satisfy relationships of the following formulas (1) and (2):

[Formula 1]
$$0.15 < \frac{RSm}{E2\_80 \times d2} \quad (1)$$

[Formula 2]
$$\frac{RSm}{\sqrt{(E1\_80 \times d1)^2 + (E2\_80 \times d2)^2}} < 135 \quad (2)$$

where: an average of surface roughness of the base material in a horizontal direction is set as RSm (mm), a Young's modulus of the base material at 80° C. is set as E1_80 (GPa), a thickness of the base material is set as d1 (mm), a Young's modulus of the cover layer at 80° C. is set as E2_80 (GPa), and a thickness of the cover layer is set as d2 (mm).

According to other embodiment in the present application, a seat back panel is formed by using the vehicular interior material according to any one of examples embodiments in the present application.

Advantageous Effects

In one example of a vehicular interior material in the present application, a thickness of a cover layer is adjusted in accordance with surface roughness of a base material in a range in which sufficient strength can be secured by the base material. Consequently, the vehicular interior material is enabled to obtain sufficient strength and to have a suitable external appearance. Further, a seat back panel formed by using the vehicular interior material is used for a seat of a vehicle, and a space in a vehicle can thereby be made luxurious.

DESCRIPTION OF EMBODIMENTS

Figure 1:
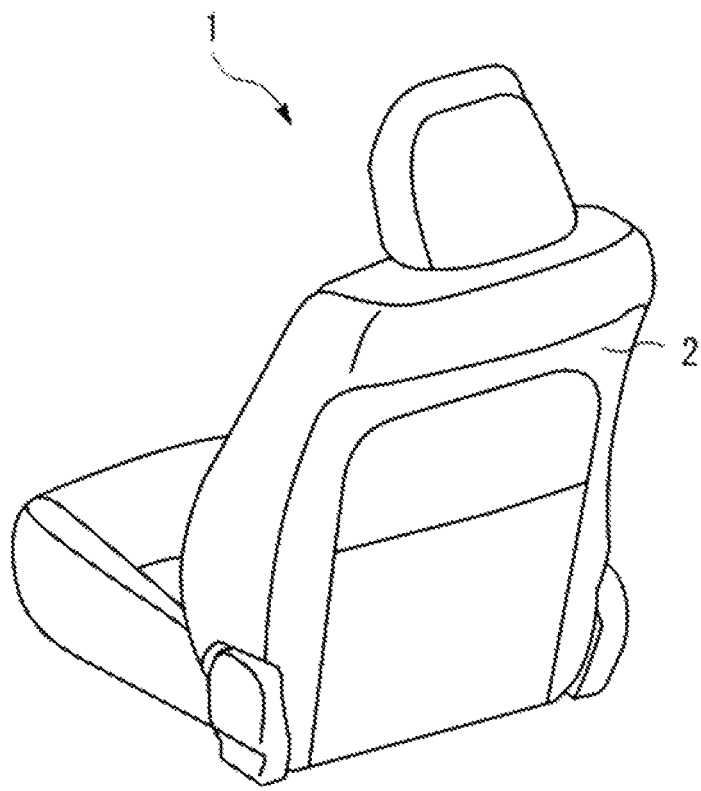
FIG. 1 is a diagram illustrating one example of a seat arranged in a vehicle.

Embodiments of a vehicular interior material according to the present application will hereinafter be described with reference to drawings. Note that the same reference characters are given to the same or corresponding components in the drawings, and descriptions thereof will be simplified or will not be repeated.

First Embodiment

FIG. 1 is a diagram illustrating one example of a seat arranged in a vehicle. As illustrated in FIG. 1, for example, vehicular interior material 10 according to the present embodiment is used as a material for a seat back panel 2 of a seat 1 for a vehicle. The seat back panel 2 is positioned in a conspicuous place in front of the eyes of a person seated on, particularly, a rear seat and occupies a large area in a vehicle cabin. Consequently, the vehicular interior material 10 according to the present embodiment is applied to the seat back panel 2, and an external appearance of a vehicle cabin space can be thereby effectively be made luxurious.

Also, the vehicular interior material 10 may suitably be used for other components installed in the vehicle, particularly, such as portions to be touched by hands of a person or portions to be seen by eyes of a person. Specifically, other than the seat back panel, for example, the vehicular interior material 10 can be used as a material which configures all or a part of a dashboard, an instrument panel, a door trim, a trim of a pillar, a rear parcel shelf, and so forth.

Figure 2:
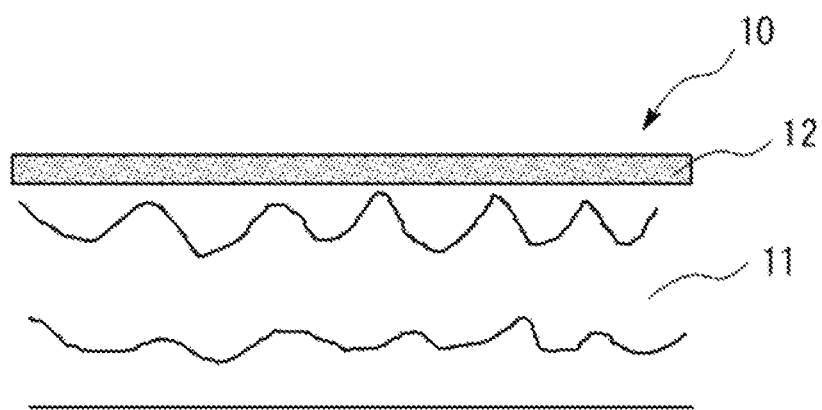
FIG. 2 is a diagram schematically illustrating a cross-sectional configuration of a vehicular interior material according to a first embodiment in the present application.

FIG. 2 is a diagram schematically illustrating a cross-sectional configuration of the vehicular interior material according to the present embodiment. As illustrated in FIG. 2, the vehicular interior material 10 is a laminated structure in which a base material 11 and a cover layer 12 are pasted together.

As the base material 11, a comparatively light material is used in which composition is adjusted such that necessary rigidity can be secured, and the base material 11 secures sufficient strength of interior components for the vehicle. Further, the base material 11 is formed by using a material which is light (low density) compared to at least the cover layer 12. Specifically, as the material of the base material 11, for example, fiber, felt such as compressed felt or knitted felt, a foamed resin such as urethane foam, a hollow structure (for example, honeycomb structure) of a resin, or the like is used. Further, the base material 11 may have a configuration in which felt and a resin or the like are laminated together.

The cover layer 12 is formed of synthetic leather containing PVC (polyvinyl chloride), for example. Here, synthetic leather containing PVC includes synthetic leather formed only of PVC and synthetic leather having PVC as a main component. Examples of the synthetic leather containing PVC as a main component may include synthetic leather in which surfaces of PVC are coated with resins such as nylon and polyurethane. Further, the cover layer 12 may be formed of synthetic leather containing another material such as PP (polypropylene), of fiber such as non-woven fabric and woven fabric, of natural leather, and so forth. The external appearance of the vehicle interior material 10 can be made luxurious by using those materials.

Figure 3:
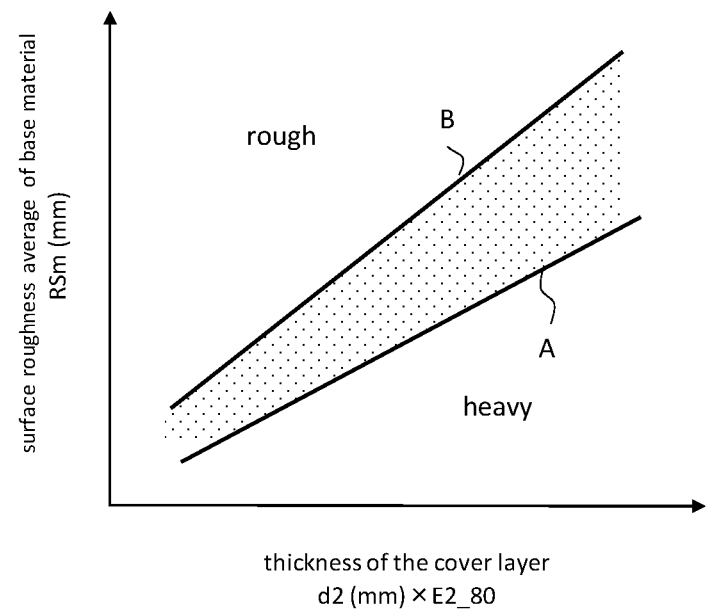
FIG. 3 is a diagram illustrating an outline of a relationship between a surface roughness average (mm) in a horizontal direction of a base material and a thickness (mm) of a cover layer, in the vehicular interior material according to the first embodiment in the present application.

FIG. 3 is a diagram illustrating an outline of the relationship between an average RSm (mm) of surface roughness of the base material 11 of the vehicular interior material 10 in a horizontal direction and a thickness d2 (mm) of the cover layer 12. In FIG. 3, the vertical axis represents the average RSm of the surface roughness of the base material 11 in the horizontal direction, and the horizontal axis represents a value of d2×E2_80 which results from multiplication of the thickness d2 of the cover layer 12 by a Young's modulus E2_80 of the material configuring the cover layer 12 at a temperature of 80° C. Note that in the following embodiments, the average of the surface roughness of the base material 11 in the horizontal direction will also simply be referred to as "roughness average". In the vehicular interior material 10 of the present embodiment, the relationship between the roughness average RSm and the thickness d2 of the cover layer 12 is adjusted such that the vehicular interior material 10 is included in a region interposed between a solid line A and a solid line B in FIG. 3.

The solid line A in FIG. 3 indicates the relationship between the roughness average RSm and the thickness d2 of the cover layer 12 which are set taking into consideration a tolerable weight. In a case where the thickness d2 of the cover layer 12 excessively becomes thick with respect to the base material 11, although smoothness of the external appearance can be secured, the thickness as the whole increases, and the weight of members formed in the vehicular interior material 10 is increased. In the first embodiment, the solid line A as a limit value on a lower limit side is decided taking into consideration the thickness and weight in a case of PP in related art and is decided such that the vehicular interior material 10 becomes an interior material lighter than at least the case of PP.

The solid line B in FIG. 3 indicates the relationship between the roughness average RSm, which is set taking into consideration a target of roughness of the external appearance of the vehicular interior material 10 in the first embodiment, and the thickness d2 of the cover layer 12. Both of the roughness of the base material 11 and the thickness of the cover layer 12 influence a magnitude of unevenness appearing on the external appearance of the vehicular interior material 10. In order to secure smoothness of a surface of the vehicular interior material 10, the thickness d2 of the cover layer 12 has to be set larger in a case where the roughness average RSm becomes larger. On the side where the roughness average RSm is larger than the solid line B in FIG. 3, the roughness of the base material 11 cannot be sufficiently concealed by the cover layer 12, and the vehicular interior material 10 allows unevenness of the external appearance to be conspicuous and luxuriousness to be impaired. Consequently, the vehicular interior material 10 in the present embodiment is set such that a ratio of the roughness average RSm becomes smaller than the solid line B.

Figure 4:
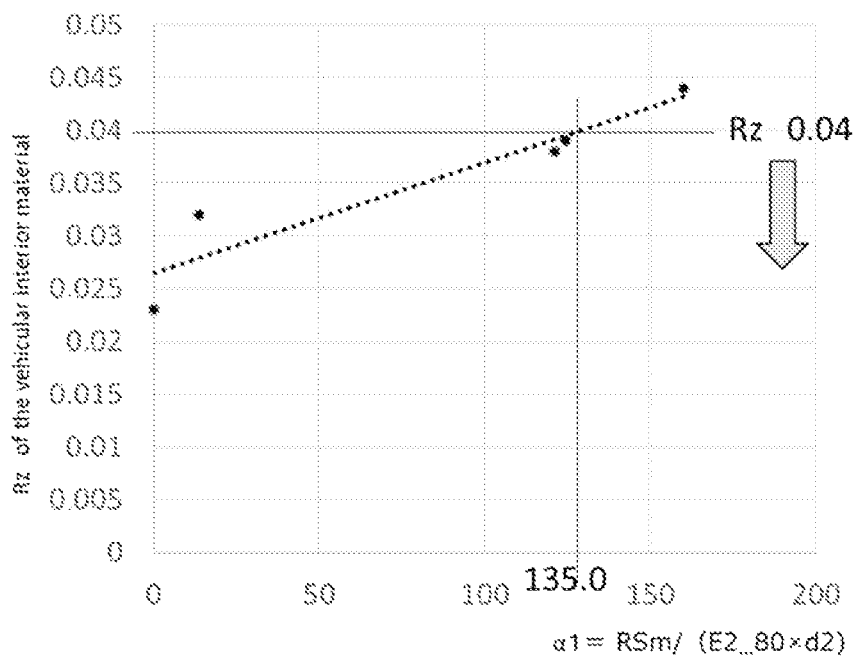
FIG. 4 is a diagram illustrating a relationship between a height average of unevenness of surface of the vehicular interior material and a ratio of the roughness average in the horizontal direction of the base material to a value which results from thickness of the cover layer in the first embodiment in the present application.

FIG. 4 is a diagram illustrating the relationship between a height average Rz of unevenness of the surface of the vehicular interior material 10 and a ratio of the roughness average RSm of the base material 11 to a value which results from the thickness d2 of the cover layer×the Young's modulus E2_80 at 80° C. As illustrated in FIG. 4, in the first embodiment, a target is set such that the height average Rz (mm) of the unevenness of the surface of the vehicular interior material 10 becomes smaller than 0.04 (mm). Then, in accordance with the target, an upper limit value of the ratio ($\alpha 2 = RSm/(d2 \times E2\_80)$) of the roughness average to the thickness of the cover layer 12 is set to 135.

Specifically, the vehicular interior material 10 of the present embodiment is configured such that the roughness average RSm (mm) and the thickness d2 (mm) of the cover layer 12 satisfy the relationship of the following formula (3). Accordingly, smoothness of the surface can be sufficiently secured while the weight is kept within a tolerable range.

[Formula 3]

$$0.15 < \frac{RSm}{E2\_80 \times d2} < 135 \qquad (3)$$

Note that a reason why the Young's modulus E2_80 of an cover material of the cover layer 12 at 80° C. is used is because the temperature is caused to conform to the highest temperature 80° C. of a thermal cycling test, the thickness d2 is defined in a state where a cover is softest, and sufficient surface smoothness is enabled to be maintained even under a harshest high temperature environment. Further, in a case where the cover layer 12 is a hollow structure or the like, the Young's modulus may be anisotropic. In such a case, a Young's modulus in any of different directions is used.

Figures 5, 6:
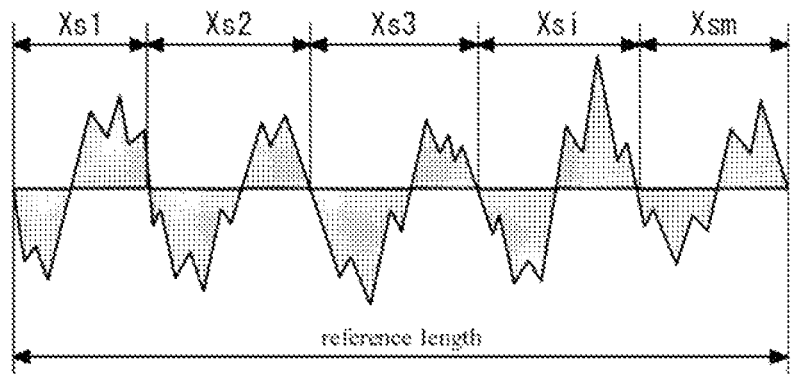
FIG. 5 is a diagram illustrating a calculation method of the roughness average RSm of the base material.
FIG. 6 illustrates specific sample examples of the vehicular interior material 10 according to the first embodiment in the present application.

Further, the roughness average RSm used in each of the formulas is a value calculated based on the definition defined by "JIS B 0601 (ISO 4287)". FIG. 5 is a diagram illustrating a calculation method of the roughness average RSm of the base material 11. As illustrated in FIG. 5, the roughness average RSm is calculated by the following formula (4).

[Formula 4]

$$RSm = \frac{1}{m}\sum_{i=1}^{N} Xsi \quad (4)$$

The roughness average RSm is a value which represents an average of a length Xsi of a contour curve element in a reference length. Here, peaks and troughs configuring a contour element have restrictions of a lowest height and a shortest length, the peaks and troughs whose heights or depths are equivalent to or less than 10% of the greatest height or the length which are equivalent to or less than 1% of a length of a calculating section are considered to be noises and are set as parts of peaks around those.

A seat back panel of a vehicle in related art has been known which is formed by injection molding of PP (polypropylene), for example. However, a component formed of PP exhibits a hard tactile feeling and has rough on a surface. Consequently, when a large amount of PP is used as the vehicular interior material and many parts where PP is exposed are present in the vehicle, luxuriousness of the vehicle cabin space is lowered. Further, in a case where a comparatively large component such as a seat back is formed of PP, the component becomes heavy because a certain sheet thickness is necessary, but due to necessity for securement of strength and retainment of a shape of the component, the sheet thickness of PP cannot simply be made thin for weight reduction. Usually, in order to achieve both of weight reduction of a component formed of PP and securement of strength, a measure is taken such as setting upright plural ribs on the inside of the component, but there is a limit to weight reduction.

On the other hand, in the vehicular interior material 10 of the present embodiment, the base material 11 is configured with a light material capable securing strength, and while the weight of the whole vehicular interior material 10 is restricted to the tolerable range, the surface of the base material 11 is covered by the cover layer 12 with a sufficient thickness corresponding to the roughness average RSm of the base material 11. Accordingly, the vehicular interior material 10 is light, has a suitable external appearance, and can secure sufficient strength.

FIG. 6 illustrates specific sample examples of the vehicular interior material 10 of the present embodiment. In the following, specific examples of the present embodiment will be described by using FIG. 6. Note that the uppermost row of a table in FIG. 6 indicates values of an interior material configured with a single PP layer as a comparative example.

Example 1

Sample 1 is a vehicular interior material 10 which uses felt with roughness average RSm=0.62 (mm) as the base material 11 and uses PP with thickness d2=2.5 (mm) as the cover layer 12. The Young's modulus E2_80 of the cover layer 12 is 1,520 (MPa). In Sample 1, α1=RSm/(E2_80×d2) is 0.163, and Sample 1 is a vehicular interior material 10 which satisfies the formula (3).

Example 2

Sample 2 is a vehicular interior material 10 which uses felt with roughness average RSm=0.905 (mm) as the base material 11 and uses PVC with thickness d2-1.22 (mm) as the cover layer 12. The Young's modulus E2_80 of the cover layer 12 is 6.3 (MPa). In Sample 2, α1=RSm/(E2_80×d2) is 124.2, and Sample 2 is a vehicular interior material 10 which satisfies the relationship of the formula (3).

Example 3

Sample 3 is a vehicular interior material 10 which uses felt with roughness average RSm=0.62 (mm) as the base material 11 and uses fiber with thickness d2=0.42 (mm) as the cover layer 12. The Young's modulus E2_80 of the cover layer 12 is 107.5 (MPa). In Sample 3, α1=RSm/(E2_80×d2) is 13.73, and Sample 3 is a vehicular interior material 10 which satisfies the relationship of the formula (3).

Example 4

Sample 5 is a vehicular interior material 10 which uses urethane foam with roughness average RSm=1.15 (mm) as the base material 11 and uses PVC with thickness d2=1.22 (mm) as the cover layer 12. The Young's modulus E2_80 of the cover layer 12 is 6.3 (MPa). In Sample 5, α1=RSm/(E2_80×d2) is 121.2, and Sample 5 is a vehicular interior material 10 which satisfies the relationship of the formula (3).

Note that Sample 4 is a vehicular interior material 10 which uses felt with roughness average RSm=1.22 (mm) as the base material 11 and uses PVC with thickness d2=1.11 (mm) as the cover layer 12. The Young's modulus E2_80 of the cover layer 12 is 7.6 (MPa). In Sample 4, α1=RSm/(E2_80×d2) is 160, and Sample 4 does not satisfy the relationship of the formula (3) and is inadequate for the vehicular interior material 10 of the present embodiment.

Second Embodiment

A vehicular interior material 10 of a second embodiment is a laminated structure in which a base 11 with a thickness d1 and a cover layer 12 with a thickness d2 are laminated together, similarly to the vehicular interior material 10 of the first embodiment. In the first embodiment, the relationship between the thickness d2 of the cover layer 12 and the roughness average RSm are defined; however, in the vehicular interior material 10 of the second embodiment, the relationship between a whole thickness (d1 and d2) and the roughness average RSm of the base material 11 is defined.

Specifically, in the vehicular interior material 10 of the second embodiment, the relationship between the roughness average RSm of the base material 11 and the thicknesses (d1 and d2) of the layers is defined as the following formula (5).

[Formula 5]

$$0.15 < \frac{RSm}{(E1\_80 \times d1)^2 + (E2\_80 \times d2)^2} < 135 \quad (5)$$

The base material 11 and the cover layer 12 of the vehicular interior material 10 are essential configuration elements, and the thicknesses d1 and d2 are thus values at least greater than zero. Further, values of E1_80 and E2_80 are respective Young's moduli of the base material 11 and the cover layer 12 at 80° C. Although a description is made in the first embodiment, in a case where the base material 11 or the cover layer 12 is a hollow structure or the like, the Young's modulus may be anisotropic. In such a case, a Young's modulus in any of different directions is used.

Note that except the point that the base material 11 and the cover layer 12 satisfy the relationship of the above formula (5), the vehicular interior material 10 of the second embodiment is the same as the first embodiment. Consequently, the descriptions about configuration materials of the layers, purposes of use, and so forth, which are made in the first embodiment, are applied to the vehicular interior material 10 of the second embodiment without any change. In a case where the relationship between the base material 11 and the cover layer 12 is defined as the formula (5), similarly to the first embodiment, the vehicular interior material 10 can be obtained which has a suitable external appearance and is light.

Third Embodiment

Figure 7:
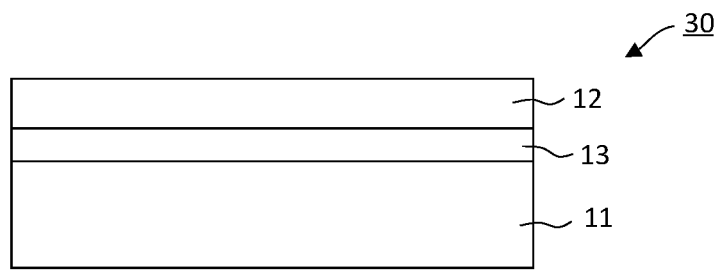
FIG. 7 is a diagram schematically illustrating a configuration of a vehicular interior material according to a third embodiment in the present application.

FIG. 7 is a diagram schematically illustrating a configuration of a vehicular interior material 30 according to a third embodiment. As illustrated in FIG. 7, the vehicular interior material 30 has an intermediate layer 13 between a base material 11 and a cover layer 12. The intermediate layer 13 is arranged for adhesion between the base material 11 and the cover layer 12 and for reinforcement of the vehicular interior material 30. As the intermediate layer 13, nonwoven fabric, fiber, PP, and so forth are used.

Given that the thickness of the cover layer 12 is set as d2, the respective thicknesses of n layers (n denotes a natural number of one or greater) included in the intermediate layer 13 are set as dMn (mm), a Young's modulus of the cover layer 12 at 80° C. is set as E2_80, and Young's moduli of the n layers included in the intermediate layer 13 at 80° C. are set as EMn_80 (GPa), the vehicular interior material 30 of the third embodiment is configured such that the roughness average RSm of the base material 11, the thickness dMn of the intermediate layer 13, and the thickness d2 of the cover layer 12 satisfy the relationship of the following formula (6).

[Formula 6]

$$0.15 < \frac{RSm}{\sqrt{(E2\_80 \times d2)^2 + \sum_{i=1}^{n}(EMi\_80 \times dMi)^2}} < 135 \qquad (6)$$

Note that similarly to cases of the base material 11 and the cover layer 12, in such a case where the intermediate layer 13 is a hollow structure or the like and its Young's modulus is anisotropic, a Young's modulus in any of different directions is used as a Young's modulus EMi_80.

In a case where the vehicular interior material 30 is configured to have the intermediate layer 13, the vehicular interior material 30 is caused to have a configuration in consideration of a thickness d3 of the intermediate layer 13 and the thickness d2 of the cover layer 12 as the above formula (6), similarly to the first and second embodiments, the vehicular interior material 30 can thereby be obtained which has a suitable external appearance, is light, and has high strength.

Note that the vehicular interior material 30 may be configured such that while the thickness d3 of the intermediate layer 13 is not included, the roughness average RSm of the base material 11 and the thickness d2 of the cover layer 12 satisfy the relationship of the formula (3). In a configuration which satisfies the relationship of the formula (3), the vehicular interior material 30 can be obtained which has a suitable external appearance, is light, and has high strength, similarly to a case of the first embodiment.

Alternatively, based on all of the thicknesses of the thicknesses dMn of the n layers included in the intermediate layer 13, the thickness d2 of the cover layer 12, and the thickness d1 of the base material 11, the vehicular interior material 30 may be adjusted such that the thicknesses and the roughness average RSm satisfy the relationship of the following formula (7).

[Formula 7]

$$0.15 < \frac{RSm}{\sqrt{(E1\_80 \times d1)^2 + (E2\_80 \times d2)^2 + \sum_{i=1}^{n}(EMi\_80 \times dMi)^2}} < 135 \qquad (7)$$

Other Embodiments

Here, in a case where the vehicular interior material 10 is configured with two layers of the base material 11 and the cover layer 12, the thickness of the base material 11 is set as d1, the thickness of the cover layer 12 is set as d2, and α1 and α2 are set as values indicated in the following formulas (8) and (9) in accordance with the above formulas (3) and (5).

[Formula 8]

$$\alpha 1 = \frac{RSm}{E2\_80 \times d2} \qquad (8)$$

[Formula 9]

$$\alpha 2 = \frac{RSm}{\sqrt{(E1\_80 \times d1)^2 + (E2\_80 \times d2)^2}} \qquad (9)$$

In the first embodiment, a description is made about a case where α1 satisfies the relationship (0.15<α<135) of the formula (3), and in the second embodiment, a description is made about a case where α2 satisfies the relationship (0.15<α2<135) of the formula (5). However, it is sufficient that the vehicular interior material 10 is configured such that the relationship between the base material 11 and the cover layer 12 is adjusted so as to satisfy at least the relationships of 0.15<α1 and α2<135.

Further, the vehicular interior material 10 is more desirably configured such that the base material 11 and the cover layer 12 are adjusted so as to satisfy the relationships of 0.15<α2 and α1<135. Because α1>α2, 0.15<α2 and α1<135 are set, and the relationship of 0.15<α2<α1<135 thereby holds. Consequently, the vehicular interior material 10 can be obtained which satisfies both of the relationships of the formula (3) in the first embodiment and of the formula (5) in the second embodiment and which has a further suitable external appearance.

Further, in a case where the vehicular interior material 30 is configured with three or more layers of the base material 11, the cover layer 12, and the intermediate layer 13 having the n layers, the thickness of the base material 11 is set as d1, the thickness of the cover layer 12 is set as d2, the thickness of each of the n layers included in the intermediate layer 13 is set as dMn, α1 is defined as the above formula (8) in accordance with the above formula (3), and α3 and α4 are set as values indicated in the following formulas (10) and (11) in accordance with the above formulas (6) and (7) described in the third embodiment.

[Formula 10]

$$a3 = \frac{RSm}{\sqrt{(E2\_80 \times d2)^2 + \sum_{i=1}^{n}(EMi\_80 \times dMi)^2}} \quad (10)$$

[Formula 11]

$$a4 = \frac{RSm}{(E1\_80 \times d1)^2 + (E2\_80 \times d2)^2 + \sum_{i=1}^{n}(EMi\_80 \times dMi)^2} \quad (11)$$

In the formula (6) of the third embodiment, a description is made about a case where roughness average RSm of the base material and the thicknesses of the cover layer 12 and the intermediate layer 13 are adjusted so as to satisfy the relationship of 0.15<α<135. However, it is sufficient that the vehicular interior material 30 is configured such that the layers 11 to 13 are adjusted so as to satisfy at least the relationships of 0.15<α1 and α4<135.

Further, the vehicular interior material 30 may be adjusted so as to satisfy the relationships of 0.15<α1 and α3<135 or may be adjusted so as to satisfy the relationships of 0.15<α3 and α4<135, for example.

More desirably, the layers 11 to 13 are adjusted so as to satisfy the relationships of 0.15<α4 and α1<135. Because α1>α3>α4, 0.15<α4 and a 1<135 are set, and the relationship of 0.15<α4<α3<α1<135 thereby holds, and the vehicular interior material 30 can be obtained which satisfies both of the relationships of the formula (6) and (7) in the third embodiment and which has a further suitable external appearance.

Note that in a case where numbers such as number, numerical quantity, amount, and range of elements are mentioned in the above embodiments, except a case where the number is particularly explicitly indicated or a case where elements are obviously and in principle specified by the number, the present invention is not limited to the mentioned number. Further, structures and so forth described in the embodiments are not necessarily essential for the present invention except a case where the structures and so forth are particularly explicitly indicated or a case where an embodiment is obviously and in principle specified by the structures and so forth.

REFERENCE SIGNS LIST

1 seat
2 seat back panel
10, 30 vehicular interior material
11 base material
12 cover layer
13 intermediate layer

The invention claimed is:

1. A vehicular interior material, wherein the vehicular interior material is a laminated structure which includes at least a base material and a cover layer, and the vehicular interior material is configured to satisfy relationships of the following formulas (1) and (2):

$$0.15 < \frac{RSm}{E2\_80 \times d2} \quad (1)$$

$$\frac{RSm}{\sqrt{(E1\_80 \times d1)^2 + (E2\_80 \times d2)^2}} < 135 \quad (2)$$

where:

an average of surface roughness of the base material in a horizontal direction is set as RSm (mm), a Young's modulus of the base material at 80° C. is set as E1_80 (GPa), a thickness of the base material is set as d1 (mm), a Young's modulus of the cover layer at 80° C. is set as E2_80 (GPa), and a thickness of the cover layer is set as d2 (mm).

2. The vehicular interior material according to claim 1, wherein the vehicular interior material is configured to further satisfy a relationship of the following formula (3):

$$0.15 < \frac{RSm}{(E1\_80 \times d1)^2 + (E2\_80 \times d2)^2}. \quad (3)$$

3. The vehicular interior material according to claim 1, wherein the base material is formed of fiber, felt, urethane foam, or a hollow structure of a resin.

4. The vehicular interior material according to claim 1, wherein the cover layer is formed of synthetic leather, non-woven fabric, woven fabric, or natural leather.

5. The vehicular interior material according to claim 1, wherein an intermediate layer having a single layer or plural layers is further provided between the cover layer and the base material.

6. The vehicular interior material according to claim 5, wherein the intermediate layer includes a layer formed of any of non-woven fabric, a resin sheet, fiber, and polypropylene.

7. The vehicular interior material according to claim 5, wherein when the intermediate layer has n layers, the vehicular interior material is configured to satisfy a relationship of the following formula (5):

$$0.15 < \frac{RSm}{\sqrt{(E2\_80 \times d2)^2 + \sum_{i=1}^{n}(EMi\_80 \times dMi)^2}} < 135 \quad (5)$$

where:

a Young's modulus of the intermediate layer at 80° C. is set as EMn_80 (GPa), and a thickness is set as dMn (mm).

8. The vehicular interior material according to claim 5, wherein
when the intermediate layer has n layers,
the vehicular interior material is configured to satisfy a relationship of the following formula (6):

$$0.15 < \frac{RSm}{\sqrt{(E1\_80 \times d1)^2 + (E2\_80 \times d2)^2 + \sum_{i=1}^{n}(EMi\_80 \times dMi)^2}} < 135 \quad (6)$$

where:
a Young's modulus of the intermediate layer at 80° C. is set as EMn_80 (GPa), and a thickness is set as dMn (mm).

9. A seat back panel which is formed by using the vehicular interior material according to claim 1.

10. A vehicular interior material, wherein
the vehicular interior material is a laminated structure which includes at least a base material and a cover layer, and
the vehicular interior material is configured to satisfy a relationship of the following formula (4):

$$0.15 < \frac{RSm}{E2\_80 \times d2} < 135 \quad (4)$$

where:
an average of surface roughness of the base material in a horizontal direction is set as RSm (mm),
a Young's modulus of the cover layer at 80° C. is set as E2_80 (GPa), and a thickness of the cover layer is set as d2 (mm).

11. The vehicular interior material according to claim 10, wherein the base material is formed of fiber, felt, urethane foam, or a hollow structure of a resin.

12. The vehicular interior material according to claim 10, wherein the cover layer is formed of synthetic leather, non-woven fabric, woven fabric, or natural leather.

13. The vehicular interior material according to claim 10, wherein an intermediate layer having a single layer or plural layers is further provided between the cover layer and the base material.

14. The vehicular interior material according to claim 13, wherein the intermediate layer includes a layer formed of any of non-woven fabric, a resin sheet, fiber, and polypropylene.

15. The vehicular interior material according to claim 13, wherein
when the intermediate layer has n layers,
the vehicular interior material is configured to satisfy a relationship of the following formula (5):

$$0.15 < \frac{RSm}{\sqrt{(E2\_80 \times d2)^2 + \sum_{i=1}^{n}(EMi\_80 \times dMi)^2}} < 135 \quad (5)$$

where:
a Young's modulus of the intermediate layer at 80° C. is set as EMn_80 (GPa), and a thickness is set as dMn (mm).

16. The vehicular interior material according to claim 13, wherein
when the intermediate layer has n layers,
the vehicular interior material is configured to satisfy a relationship of the following formula (6):

$$0.15 < \frac{RSm}{\sqrt{(E1\_80 \times d1)^2 + (E2\_80 \times d2)^2 + \sum_{i=1}^{n}(EMi\_80 \times dMi)^2}} < 135 \quad (6)$$

where:
a Young's modulus of the intermediate layer at 80° C. is set as EMn_80 (GPa), and a thickness is set as dMn (mm).

17. A seat back panel which is formed by using the vehicular interior material according to claim 10.

* * * * *